United States Patent
Kim

(10) Patent No.: US 7,778,602 B2
(45) Date of Patent: Aug. 17, 2010

(54) METHOD AND APPARATUS FOR SEARCHING NEIGHBORING BLUETOOTH DEVICES IN A PORTABLE TERMINAL

(75) Inventor: Chul-Woo Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 972 days.

(21) Appl. No.: 11/515,636

(22) Filed: Sep. 5, 2006

(65) Prior Publication Data
US 2007/0105500 A1  May 10, 2007

(30) Foreign Application Priority Data
Nov. 7, 2005  (KR) ...................... 10-2005-0105859

(51) Int. Cl.
H04B 7/00 (2006.01)
(52) U.S. Cl. ...................... 455/41.2; 455/405; 455/410; 455/412.1; 370/349; 709/235
(58) Field of Classification Search ................ 455/41.2, 455/405, 410, 412.1, 567, 418; 370/349, 370/379, 383; 709/235
See application file for complete search history.

(56) References Cited

U.S. PATENT DOCUMENTS

| | | | |
|---|---|---|---|
| 7,167,892 B2 * | 1/2007 | Defosse et al. ............. | 709/200 |
| 7,194,238 B2 | 3/2007 | Virtanen | |
| 2002/0019943 A1 * | 2/2002 | Cho et al. .................. | 713/200 |
| 2002/0183068 A1 * | 12/2002 | Dunko et al. ............... | 455/456 |
| 2002/0198851 A1 * | 12/2002 | Hashimoto et al. .......... | 705/400 |
| 2004/0133653 A1 * | 7/2004 | Defosse et al. ............. | 709/217 |
| 2004/0213212 A1 | 10/2004 | Reding et al. | |
| 2005/0250552 A1 * | 11/2005 | Eagle et al. ................ | 455/567 |
| 2005/0257052 A1 * | 11/2005 | Asai et al. .................. | 713/166 |
| 2006/0240821 A1 * | 10/2006 | Chien ........................ | 455/433 |
| 2006/0242022 A1 * | 10/2006 | Hashimoto et al. ........... | 705/14 |
| 2007/0083287 A1 * | 4/2007 | Defosse et al. ............. | 700/236 |
| 2007/0226702 A1 * | 9/2007 | Segger ...................... | 717/130 |
| 2008/0168031 A1 * | 7/2008 | Songer ....................... | 707/3 |
| 2009/0065578 A1 * | 3/2009 | Peterson et al. ............ | 235/382 |

FOREIGN PATENT DOCUMENTS

| | | |
|---|---|---|
| CN | 1430339 | 7/2003 |
| CN | 1536825 | 10/2004 |
| EP | 1 465 390 A2 | 10/2004 |
| EP | 1 566 938 A1 | 8/2005 |
| KR | 20040086647 | 10/2004 |

OTHER PUBLICATIONS

Tourrilhes et al., On-Demand TCP: Transparent Peer to Peer TCP/IP over IrDA, 2002 IEEE, pp. 3250-3258.

* cited by examiner

*Primary Examiner*—Minh D Dao
(74) *Attorney, Agent, or Firm*—The Farrell Law Firm, LLP

(57) ABSTRACT

Provided are a method and an apparatus for searching neighboring Bluetooth devices in a portable terminal having a Bluetooth module. In the method, addresses of searched neighboring Bluetooth devices are used to determine whether the searched neighboring Bluetooth devices are newly-searched Bluetooth devices. If the searched neighboring Bluetooth devices are newly-searched neighboring Bluetooth devices, name request signals are transmitted to the newly-searched neighboring Bluetooth devices to acquire names of the newly-searched neighboring Bluetooth devices. Names of the newly-searched neighboring Bluetooth devices are created, and the addresses, names and names of the newly-searched neighboring Bluetooth devices are registered in a Bluetooth management database.

21 Claims, 3 Drawing Sheets

METHOD AND APPARATUS FOR SEARCHING NEIGHBORING BLUETOOTH DEVICES IN A PORTABLE TERMINAL

PRIORITY

This application claims priority under 35 U.S.C. §119 to a Korean application filed in the Korean Intellectual Property Office on Nov. 7, 2005 and assigned Serial No. 2005-105859, the contents of which are incorporated herein by reference.

BACKGROUND OF THE INVENTION

1. Field of the Invention

The present invention relates generally to a portable terminal with a Bluetooth® (hereinafter called Bluetooth) module, and in particular, to a method and an apparatus for searching for Bluetooth devices in neighboring Bluetooth equipped portable terminals to enhance the speed and accuracy of the search by assigning a nickname to a Bluetooth management database in the portable terminal. Here, the nickname generally refers to a name assigned to a neighboring Bluetooth device by the portable terminal.

2. Description of the Related Art

Bluetooth is a technology for providing short range wireless communications. Bluetooth technology makes it possible to wirelessly connect Bluetooth devices within a relatively short range at low cost. In Bluetooth communication, radio frequencies are used to exchange voice and data signals between Bluetooth devices within a relatively short range without the need of physical cables. For example, when a mobile communication terminal and a laptop computer are each equipped with a Bluetooth module, they can be wirelessly connected each other, i.e. without using cables. Almost all types of digital devices such as personal digital assistants (PDAs), desktop computers, facsimiles (FAXs), keyboards, and joysticks can utilize Bluetooth communication if they have a Bluetooth module.

A device having a Bluetooth module searches neighboring Bluetooth devices and performs a pairing process with the searched Bluetooth device so that it can wirelessly communicate with the searched Bluetooth device. The pairing process is an authentication process in which an inter-device common link key defined in the Bluetooth interface standard is created to authenticate an inter-device common link.

FIG. 1 is a diagram illustrating a connection of neighboring Bluetooth devices to a portable terminal having a Bluetooth module.

Referring to FIG. 1, a portable terminal 100 having a Bluetooth module searches for neighboring Bluetooth devices 111, 113, 115 or 117. Thereafter, the portable terminal 100 creates a Bluetooth device list 102 for the searched neighboring Bluetooth devices 111, 113, 115 and 117, and selects a Bluetooth device for connection in the created Bluetooth device list 102.

As described above, the portable terminal 100 must search for neighboring Bluetooth devices so as to connect to a neighboring Bluetooth device. The process of searching for neighboring Bluetooth devices includes a first operation of acquiring the addresses and device classes of the neighboring Bluetooth devices and a second operation of acquiring the names of the neighboring Bluetooth devices. Here, the names of the neighboring Bluetooth devices are originally set and may be changed by the neighboring Bluetooth devices user, and are different from the nicknames that the searching portable terminal would generally assign to the neighboring Bluetooth devices. The searching process is essential when a service for the neighboring Bluetooth device is connected for the first time.

The portable terminal transmits name request signals to the neighboring Bluetooth devices after acquiring the addresses of the neighboring Bluetooth devices. Thereafter, the portable terminal waits between 0.625 milliseconds and 50.9 seconds (generally 5.12 seconds) to receive responses from the neighboring Bluetooth devices. Therefore, if the first and second operations are performed every time when the neighboring Bluetooth devices are searched, the searching operation involves an excessive delay.

In a conventional method for solving the above problem, when an already-searched neighboring Bluetooth device is searched again, the name of the searched neighboring Bluetooth device is detected using the existing Bluetooth management database without performing the name search operation on the searched neighboring Bluetooth device. However, the name of the neighboring Bluetooth device may be easily changed by Bluetooth device user. Therefore, if the names of the neighboring Bluetooth devices are changed, it is impossible to accurately connect to a desired Bluetooth device. Moreover, if the names of the neighboring Bluetooth devices overlap each other, there is a difficulty to connect to a desired Bluetooth device. Therefore, a method and an apparatus for searching neighboring Bluetooth devices with improved speed and accuracy in a portable terminal having a Bluetooth module are needed.

SUMMARY OF THE INVENTION

An object of the present invention is to substantially solve at least the above problems and/or disadvantages of conventional systems and to provide at least the advantages below. Accordingly, an object of the present invention is to provide a method and an apparatus for searching neighboring Bluetooth devices in a portable terminal having a Bluetooth module, which can enhance the speed and accuracy of the search.

Another object of the present invention is to provide a method and an apparatus for searching neighboring Bluetooth devices in a portable terminal having a Bluetooth module, which can enhance the speed and accuracy of the search by adding a nickname field to a Bluetooth management database table of the portable terminal.

According to one aspect of the present invention, a method is provided for registering a plurality of neighboring Bluetooth devices in a portable terminal having a Bluetooth module, the method includes acquiring addresses of the searched neighboring Bluetooth devices; comparing an acquired address with addresses in a Bluetooth management database; assigning a nickname to a searched neighboring Bluetooth devices if a corresponding address is not found in the Bluetooth management database; and registering the nickname of the searched neighboring Bluetooth device with the acquired address in the Bluetooth management database.

According to another aspect of the present invention, a portable terminal having a Bluetooth module for registering a neighboring Bluetooth device is provided that includes a memory unit for storing a Bluetooth management database and a controller for acquiring an address of the searched neighboring Bluetooth device, comparing an acquired address with an address in the Bluetooth management database, assigning a nickname of the searched neighboring Bluetooth devices if a corresponding address is not found in the Bluetooth management database; and registering the nickname of the searched neighboring Bluetooth device with the address of the searched neighboring Bluetooth device in the Bluetooth management database.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENTS

Preferred embodiments of the present invention are described herein below with reference to the accompanying drawings. In the following description, well-known functions or constructions are not described in detail because they would obscure the present invention in unnecessary detail.

The present invention provides a method and an apparatus for searching for neighboring Bluetooth devices in a portable terminal having a Bluetooth module, which can enhance the speed and accuracy of the search by adding a nickname field to a Bluetooth management database table in a searching portable terminal. Examples of the Bluetooth devices include a mobile communication terminal, an MP3 (MPEG layer-3) player, a digital camera, an electronic notebook and an international mobile telecommunications-2000 (IMT-2000) terminal. In the following description, a mobile communication terminal is provided as an example of the Bluetooth-equipped device that performs the search.

Figure 1:
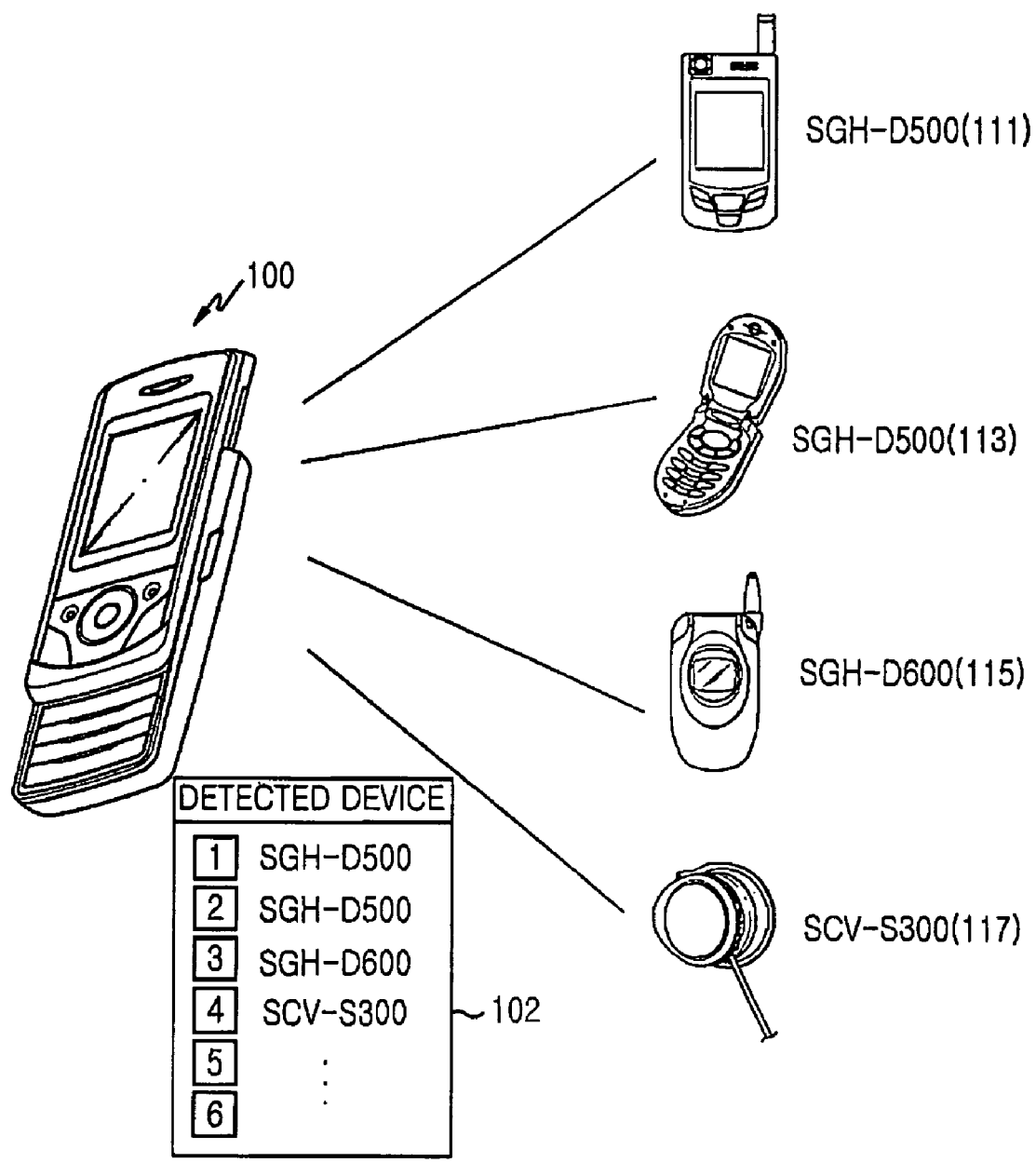
FIG. 1 is a schematic diagram illustrating a connection of neighboring Bluetooth devices to a portable terminal having a Bluetooth module.
Figure 2:
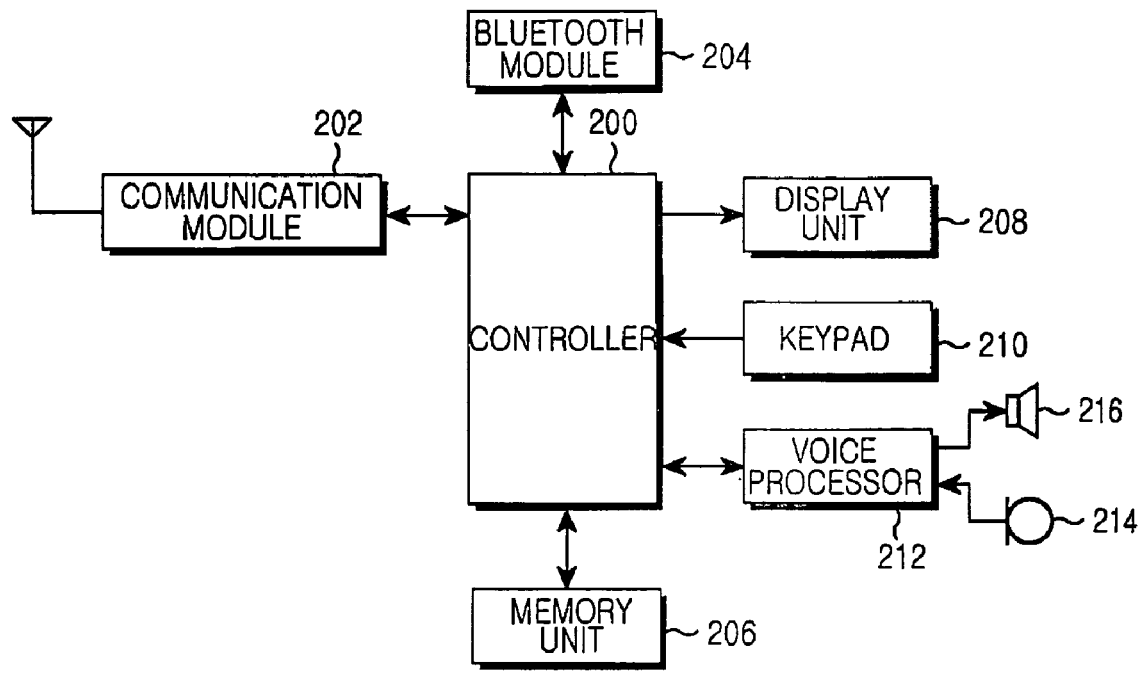
FIG. 2 is a block diagram of a mobile communication terminal having a Bluetooth module according to the present invention.

FIG. 2 is a block diagram of a mobile communication terminal having a Bluetooth module according to the present invention. Referring to FIG. 2, the mobile communication terminal includes a controller (e.g., a microprocessor unit (MPU)) 200, a communication module 202, a Bluetooth module 204, a memory unit 206, a display unit 208, a keypad 210, a voice processor (e.g., a codec) 212, an antenna, a microphone 214 and a speaker 216. The controller 200 controls an overall operation of the mobile communication terminal. For example, the controller 200 processes and controls voice communication and data communication. In addition, the controller 200 performs a function for assigning a nickname for a searched neighboring Bluetooth device and identifying the searched neighboring Bluetooth device using the assigned nickname. A detailed description about the general control operation of the controller 200 will not be described for conciseness.

The communication module 202 processes radio-frequency (RF) data signals that are transmitted and received through the antenna. For example, the communication module 202 converts baseband signals, into which Tx data have been channel-coded and spread, into RF signals and transmits the RF signals through the antenna. Also, the communication module 202 converts received RF signals into baseband signals and de-spreads/channel-decodes the baseband signals to recover original data.

Under the control of the controller 200, the Bluetooth module 204 searches for connectable neighboring Bluetooth devices and performs a pairing operation on the searched neighboring Bluetooth devices to acquire the addresses and names of the searched neighboring Bluetooth devices.

The Bluetooth module 204 may be merged into the controller 200. In this case, a merged controller having Bluetooth module function may be called a controller.

The memory unit 206 includes a read only memory (ROM), a random access memory (RAM), and a Flash ROM. The ROM stores a variety of reference data and microcodes of a program for the process/control operation of the controller 200. The RAM is a working memory of the controller 200 that stores temporary data generated during the execution of various programs. The Flash ROM 106 stores a variety of updatable data such as a phone book, an outgoing message, and an incoming message. In addition, the flash ROM preferably stores a Bluetooth management database (alternatively called a Bluetooth management database table) for storing addresses, names and assigned nicknames of searched neighboring Bluetooth devices.

The display unit 208 displays information that includes status information generated during operations, numerals and characters, moving pictures and still pictures. The display unit 208 may be a color liquid crystal display (LCD). The keypad 210 includes numeric key buttons of digits 0-9 and a plurality of function keys, such as a Menu key, a Cancel (delete) key, a Confirmation key, a Talk key, an End key, an Internet connection key, and Navigation keys (▲/▼/◄/►) to provide a key input date that corresponds to a key pressed by a user to the controller 200. A touch pad or a touch screen (not shown) may also be used as an input means. In this case touch elements in the touch pad or the touch screen correspond to the key buttons and keys in the key pad as described above.

The voice processor 212 converts digital data received from the controller 200 into analog voice signals to output the analog voice signals to the speaker 216, and converts voice signals received through the microphone 214 into digital data to provide the digital data to the controller 200.

Figure 3:
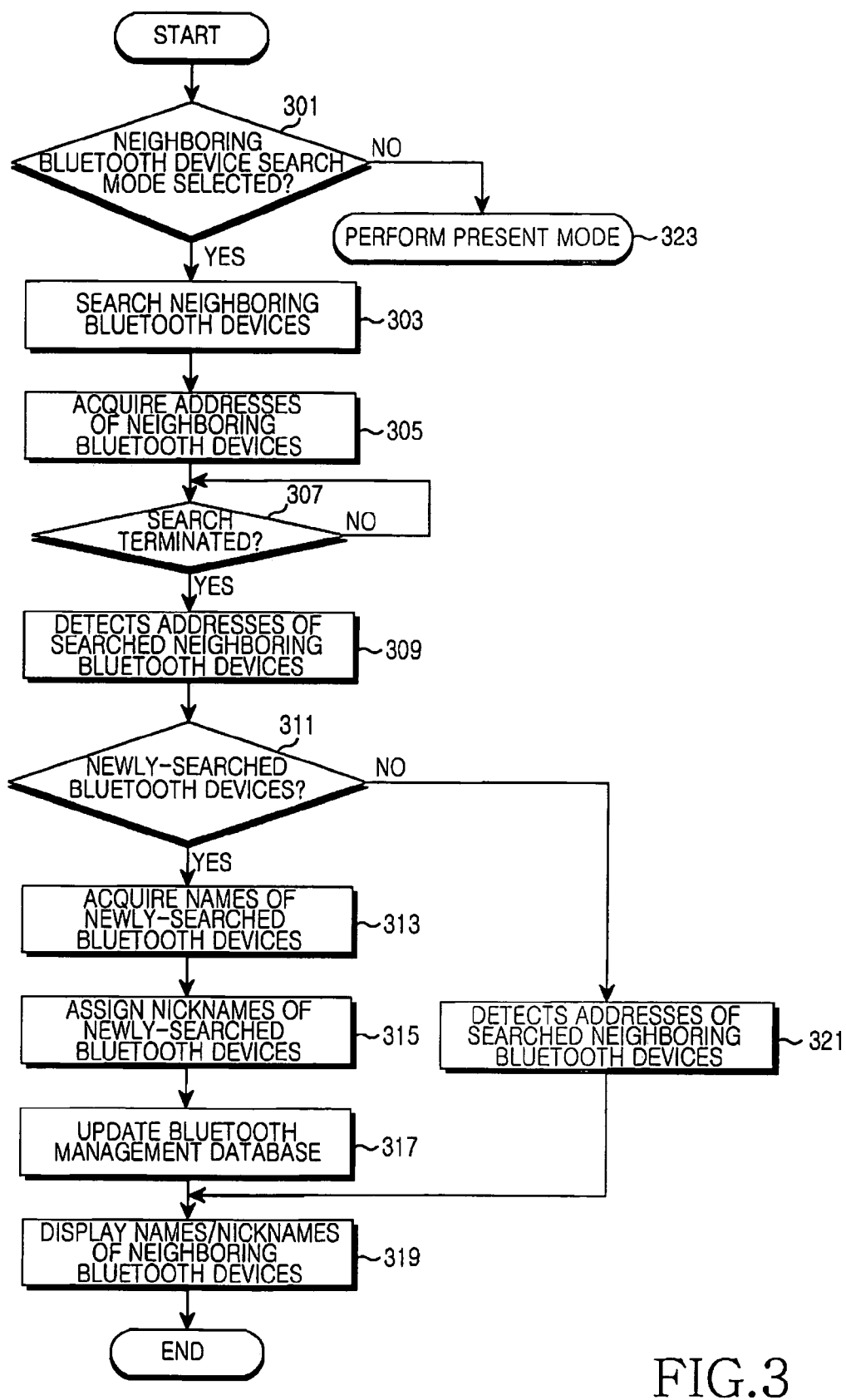
FIG. 3 is a flowchart illustrating a process for searching a neighboring Bluetooth device in a mobile communication terminal having a Bluetooth module according to the present invention.

FIG. 3 is a flowchart illustrating a process for searching a neighboring Bluetooth device in a mobile communication terminal having a Bluetooth module according to the present invention.

Referring to FIG. 3, the controller 200 determines in step 301 if a neighboring Bluetooth device search mode is selected. If not, controller 200 proceeds to step 323 to perform present mode operations (e.g., an idle mode). If so, the controller proceeds to step 303. In step 303, the controller 200 broadcasts an inquiry packet to search for neighboring Bluetooth devices.

In step 305, the controller 200 identifies if the mobile communication terminal receives response signals from the neighboring Bluetooth devices that received the inquiry packet, and controls the Bluetooth module 204 to acquire addresses of the neighboring Bluetooth devices that are contained in the response signals.

In step 307, the controller 200 determines if the search of the neighboring Bluetooth devices is terminated. If not, it repeats step 307. If so, the controller 200 proceeds to step 309. In general, the received response signals are maintained for at least 10.24 seconds. In step 309, the controller 200 detects addresses of the searched neighboring Bluetooth devices.

In step 311, the controller 200 compares the detected addresses with Bluetooth device addresses stored in the Bluetooth management database, thereby determining if the searched neighboring Bluetooth devices are newly-searched Bluetooth devices, i.e., if the detected addresses do not exist in the Bluetooth management database table.

If the searched neighboring Bluetooth devices are newly-searched (if the detected addresses do not exist in the Bluetooth management database table), the controller 200 proceeds to step 313. In step 313, the controller 200 transmits name request signals to the newly-searched neighboring Bluetooth devices to acquire names of the newly-searched neighboring Bluetooth devices.

In step 315, the controller 200 assigns nicknames of the newly-searched neighboring Bluetooth devices. For example, the nicknames of the newly-searched neighboring Bluetooth devices may include the names and search dates of the neighboring Bluetooth devices, as illustrated in Table 1 below. Here, the nickname is a uniquely assigned to the searched Bluetooth device by a mobile communication terminal.

TABLE 1

| Device Name | Device Nickname |
|---|---|
| Test | 050802_Test |
| MyCom | 050802_MyCom |
| Phone | 050802_Phone |
| Phone | 050802_Phone_1 |
| Phone | 050802_Phone_2 |

As shown in Table 1, if there are any neighboring Bluetooth devices having the same name and search date, serial numbers may additionally be assigned to distinguish such neighboring Bluetooth devices. The nicknames of the neighboring Bluetooth devices may be changed by a user of the mobile communication terminal.

In step 317, the controller 200 registers the addresses, names and nicknames of the newly-searched neighboring Bluetooth devices in the Bluetooth management database. In step 319, the controller 200 displays the names and nicknames of the searched neighboring Bluetooth devices on the display unit 208. Thereafter, the controller ends the searching process.

Meanwhile, if the detected addresses exist in the Bluetooth management database, the controller 200 proceeds to step 321. In step 321, the controller 200 detects names and nicknames of the neighboring Bluetooth devices in the Bluetooth management database, and proceeds to step 319, described above.

After registering the neighboring Bluetooth device, the searching for a neighboring Bluetooth device can be performed by comparing the address of the searched neighboring Bluetooth device with addresses in the Bluetooth management database and identifying the nickname in the Bluetooth management database.

As described above, the present invention uses the nicknames to distinguish the neighboring Bluetooth devices. Accordingly, it is possible to reduce the time to perform future searches for neighboring Bluetooth device. In addition, the searched neighboring Bluetooth devices can be accurately distinguished by their unique nicknames even when their names are changed by the user of the searched neighboring Bluetooth devices.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A method for registering a neighboring Bluetooth devices in a portable terminal having a Bluetooth module, the method comprising:
   acquiring addresses of searched neighboring Bluetooth devices;
   comparing an acquired address with addresses in a Bluetooth management database;
   assigning a nickname to a searched neighboring Bluetooth device if a corresponding address is not found in the Bluetooth management database; and
   registering the nickname of the searched neighboring Bluetooth device with the acquired address in the Bluetooth management database,
   wherein the nickname is generated in the portable terminal.

2. The method of claim 1, further comprising searching the Bluetooth management database to detect nicknames corresponding to address of neighboring Bluetooth device and identifying whether the acquired address matches an address in the Bluetooth management database.

3. The method of claim 1, wherein the nickname includes a name and a searching date of the neighboring Bluetooth device.

4. The method of claim 3, wherein the nickname further includes a serial number to distinguish the searched Bluetooth device if a neighboring Bluetooth device has a matching name and search date.

5. The method of claim 3, further comprising:
   acquiring a name of the searched neighboring Bluetooth device if a matching address is not found in the Bluetooth management database; and
   registering the nickname of the searched neighboring Bluetooth device with the address and the name of the searched neighboring Bluetooth device in the Bluetooth management database.

6. The method of claim 3, further comprising:
   determining, using the acquired addresses, whether the searched neighboring Bluetooth devices are newly-searched Bluetooth devices;
   if the searched neighboring Bluetooth devices are newly-searched neighboring Bluetooth devices, transmitting name request signals to the newly-searched neighboring Bluetooth devices and acquiring names of the newly-searched neighboring Bluetooth devices;
   assigning nicknames to the newly-searched neighboring Bluetooth devices; and
   registering the addresses, names and nicknames of the newly-searched neighboring Bluetooth devices in a Bluetooth management database.

7. The method of claim 6, wherein determining whether the searched neighboring Bluetooth devices are newly-searched neighboring Bluetooth devices comprises the steps of:
   comparing the addresses of the searched neighboring Bluetooth devices with addresses stored in the Bluetooth management database; and
   if the addresses of the searched neighboring Bluetooth devices do not exist in the Bluetooth management database, recognizing the searched neighboring Bluetooth devices as newly-searched neighboring Bluetooth devices.

8. The method of claim 1, wherein the nickname can be changed by a user of the portable terminal.

9. The method of claim 1, wherein the Bluetooth management database includes addresses, names and nicknames of the neighboring Bluetooth devices.

10. A method for searching for a neighboring Bluetooth device in a portable terminal having a Bluetooth module, the method comprising:

acquiring an address of the neighboring Bluetooth device;

comparing the address with an address in a Bluetooth management database; and upon a determination that the acquired address matches the address in the Bluetooth management database, identifying, from the Bluetooth management database, a nickname generated in the mobile terminal such that the nickname is identified according to the acquired address.

11. The method of claim 10, wherein the nickname includes a name and a searching date of the neighboring Bluetooth device.

12. The method of claim 10, wherein the nickname can be changed by a user of the portable terminal.

13. The method of claim 10, wherein the Bluetooth management database includes addresses, names and nicknames of the neighboring Bluetooth devices.

14. A portable terminal having a Bluetooth module for registering a neighboring Bluetooth device, comprising:

a memory unit for storing a Bluetooth management database; and a controller for acquiring addresses of searched neighboring Bluetooth devices, comparing an acquired address with an address in the Bluetooth management database, assigning a nickname of the searched neighboring Bluetooth devices if a corresponding address is not found in the Bluetooth management database; and registering the nickname of the searched neighboring Bluetooth device with the address of the searched neighboring Bluetooth device in the Bluetooth management database, wherein the nickname is generated in the portable terminal.

15. The portable terminal of claim 14, wherein the nickname includes a name and a searching date of the neighboring Bluetooth device.

16. The portable terminal of claim 14, wherein the nickname can be changed by a user of the portable terminal.

17. The portable terminal of claim 14, wherein the Bluetooth management database includes the addresses, names and nicknames of the neighboring Bluetooth devices.

18. A portable terminal having a Bluetooth module for searching a neighboring Bluetooth device, comprising:

a memory unit for storing a Bluetooth management database; and a controller for acquiring an address of a searched neighboring Bluetooth device, comparing an acquired address with an address in a Bluetooth management database, and upon a determination that the acquired address matches the address in the Bluetooth management database, identifying, from the Bluetooth management database, a nickname generated in the mobile terminal such that the nickname is identified according to the acquired address.

19. The portable terminal of claim 18, wherein the nickname includes a name and a searching date of the neighboring Bluetooth device.

20. The portable terminal of claim 18, wherein the nickname can be changed by a user of the portable terminal.

21. The portable terminal of claim 18, wherein the Bluetooth management database includes addresses, names and nicknames of the neighboring Bluetooth devices.

* * * * *